US008532628B2

(12) United States Patent
Kalinichenko et al.

(10) Patent No.: US 8,532,628 B2
(45) Date of Patent: Sep. 10, 2013

(54) REGISTERING ACTIONABLE ALERTS

(75) Inventors: Boris Olegovich Kalinichenko, Jamaica Plain, MA (US); Joseph G. Ferra, Dover, MA (US)

(73) Assignee: FMR LLC, Boston, MA (US)

( * ) Notice: Subject to any disclaimer, the term of this patent is extended or adjusted under 35 U.S.C. 154(b) by 1675 days.

(21) Appl. No.: 11/454,598

(22) Filed: Jun. 16, 2006

(65) Prior Publication Data
US 2007/0293275 A1    Dec. 20, 2007

(51) Int. Cl.
  H04M 3/42     (2006.01)
  H04W 4/12     (2009.01)
  H04W 4/14     (2009.01)
  G06Q 40/00    (2012.01)

(52) U.S. Cl.
  USPC ............ 455/414.1; 455/466; 705/35; 705/42; 705/44

(58) Field of Classification Search
  USPC ................ 455/435.1, 403, 414.1–414.4, 466; 705/42–44, 73, 35–36 R
  See application file for complete search history.

(56) References Cited

U.S. PATENT DOCUMENTS

| | | | |
|---|---|---|---|
| 4,499,456 A | 2/1985 | Turpin, Sr. et al. | |
| 5,233,692 A | 8/1993 | Gajjar et al. | |
| 5,247,438 A | 9/1993 | Subas et al. | |
| 5,418,518 A | 5/1995 | Schenken et al. | |
| 5,454,085 A | 9/1995 | Gajjar et al. | |
| 5,576,952 A | 11/1996 | Stutman et al. | |
| 5,607,459 A | 3/1997 | Paul et al. | |
| 5,615,408 A | 3/1997 | Johnson et al. | |
| 5,640,148 A | 6/1997 | Lewis et al. | |
| 5,703,567 A | 12/1997 | Cleveland | |
| 5,903,211 A | 5/1999 | Flego et al. | |
| 5,909,179 A | 6/1999 | Hiltman | |
| 5,953,650 A | 9/1999 | Villevieille | |
| 6,021,433 A | 2/2000 | Payne et al. | 709/219 |
| 6,150,928 A | 11/2000 | Murray | |
| 6,167,298 A | 12/2000 | Levin | |
| 6,167,426 A | 12/2000 | Payne et al. | 709/200 |
| 6,177,905 B1 | 1/2001 | Welch | |
| 6,192,057 B1 | 2/2001 | Dueck et al. | |
| 6,223,072 B1 | 4/2001 | Mika et al. | |
| 6,249,222 B1 | 6/2001 | Gehlot | |
| 6,535,855 B1 * | 3/2003 | Cahill et al. | 705/346 |
| 6,735,614 B1 | 5/2004 | Payne et al. | 709/203 |
| 6,816,724 B1 * | 11/2004 | Asikainen | 455/414.1 |
| 7,043,230 B1 * | 5/2006 | Geddes et al. | 455/410 |
| 7,136,661 B2 * | 11/2006 | Graske et al. | 455/466 |
| 7,258,267 B2 * | 8/2007 | Choi | 235/379 |
| 7,555,287 B1 | 6/2009 | Heinonen et al. | |
| 7,610,045 B2 * | 10/2009 | Little et al. | 455/418 |
| 7,809,357 B2 * | 10/2010 | Hall et al. | 455/412.2 |
| 8,060,389 B2 | 11/2011 | Johnson | |
| 2001/0049603 A1 * | 12/2001 | Sravanapudi et al. | 704/270.1 |

(Continued)

FOREIGN PATENT DOCUMENTS

WO    WO 2004112275 A1 *  12/2004

*Primary Examiner* — Matthew Sams
(74) *Attorney, Agent, or Firm* — Proskauer Rose LLP

(57) ABSTRACT

Described are methods and systems, including computer program products, for registering, configuring, and invoking actionable alerts. For example, an alert action is determined based on an alert. The alert is sent to a device based on an alert logic and the alert action is sent to the device based on a device capability. A received communication is identified as a response from the first device based on the alert requesting performance of the alert action.

19 Claims, 8 Drawing Sheets

(56) References Cited

U.S. PATENT DOCUMENTS

| | | | |
|---|---|---|---|
| 2002/0019812 A1* | 2/2002 | Board et al. | 705/51 |
| 2002/0103881 A1* | 8/2002 | Granade et al. | 709/218 |
| 2002/0138433 A1* | 9/2002 | Black et al. | 705/43 |
| 2002/0144233 A1* | 10/2002 | Chong et al. | 717/105 |
| 2003/0115122 A1* | 6/2003 | Slater et al. | 705/35 |
| 2003/0149653 A1* | 8/2003 | Penney et al. | 705/37 |
| 2003/0229670 A1* | 12/2003 | Beyda | 709/206 |
| 2004/0122771 A1* | 6/2004 | Celi et al. | 705/43 |
| 2004/0131014 A1* | 7/2004 | Thompson et al. | 370/230 |
| 2004/0162109 A1* | 8/2004 | Shimoda et al. | 455/557 |
| 2004/0203799 A1* | 10/2004 | Siegel | 455/445 |
| 2005/0080768 A1 | 4/2005 | Zhang et al. | |
| 2005/0176449 A1* | 8/2005 | Cui et al. | 455/466 |
| 2005/0177614 A1* | 8/2005 | Bourne | 709/200 |
| 2005/0198506 A1* | 9/2005 | Qi et al. | 713/170 |
| 2006/0111971 A1 | 5/2006 | Salesin et al. | |
| 2006/0218226 A1 | 9/2006 | Johnson et al. | |
| 2007/0053518 A1* | 3/2007 | Tompkins et al. | 380/270 |
| 2007/0259718 A1 | 11/2007 | Bleecker | |
| 2007/0280232 A1* | 12/2007 | Dec et al. | 370/390 |
| 2007/0290832 A1* | 12/2007 | Kalinichenko et al. | 340/506 |
| 2009/0305667 A1* | 12/2009 | Schultz | 455/410 |

* cited by examiner

REGISTERING ACTIONABLE ALERTS

FIELD OF THE INVENTION

The present invention relates generally to alerts and, more specifically, to registering, configuring, and/or invoking actionable alerts.

BACKGROUND

Cellular telephones, personal digital assistants ("PDAs") with wireless communication capabilities, and paging devices allow users to receive incoming communications while away from conventional means of communication, e.g., landline telephones and/or computers. Typically these devices include limited display screens that allow for only limited presentation of content compared to more traditional means of communication. For example, viewing an email message on a PDA may require scrolling through "pages" of the email to read the entire message whereas on a computer screen the message would be viewable on one page and would not require scrolling. In effect, display and interaction convenience is traded for connectivity and portability.

Many content and financial services providers wish to keep their users/clients as informed as possible of new content, services, and/or the client's account information. For financial services providers this may mean alerting a client to new or interesting products, news related to the client's holdings (or related to stocks the client is watching) or changes to the value of the client's account. Due to the limited displays and presentation capabilities available on portable communication devices, as well as the plethora of different devices and different display configurations, it is difficult to interact efficiently and present multiple options and accompanying text to a client's portable device. In addition, with tech-savvy clients, who may change communication devices frequently, it is inefficient to manually reconfigure content sent to the client's devices so that the content displays correctly.

SUMMARY OF THE INVENTION

The invention is embodied in various implementations. In one implementation, there is a method of registering an alert. The method includes receiving, via a network server, identifier information about a first device from a second device representing a request to register the first device. The method also includes storing the identifier information in a storage device associated with transmitting alerts, sending a registration message based on the identifier information to the first device, and receiving a message from the first device in response to the registration message. After the message is received from the first device, the method includes verifying that the message from the first device is associated with the registration message and modifying, based on the message from the first device, the storage device to indicate a capability of the first device. In some versions, the method includes determining the capability of the first device based on the message from the first device. Typically, the determining step includes reading header information associated with the message from the first device. In some embodiments, the registration message activates a software application on the first device. In some implementations, the first device and the second device are the same device, while in other implementations the first device and the second device are different devices. For example, in some versions, the first device is a wireless device and the second device is a personal computer. The identifier information may be one of, or combinations of, but is not limited to, a telephone number, an email address, a logical identifier, a physical identifier, a Media Access Control ("MAC") address. In some implementations the registration message is a Short Message Service ("SMS") message, a Wireless Access Protocol ("WAP") message, or both. Alternatively or additionally, in some implementations, the registration message is a digitized voice message.

In one implementation, there is a means for registering an alert. The means includes means for receiving, via a network server, identifier information about a first device from a second device representing a request to register the first device. The means for registering an alert also includes means for storing the identifier information in a storage device associated with transmitting alerts and means for sending a registration message based on the identifier information to the first device. Furthermore, typically there are means for receiving a message from the first device in response to the registration message, and means for verifying the message from the first device is associated with the registration message. Once verified, often, there are means for modifying, based on the message from the first device, the storage device to indicate a capability of the first device.

There is also a system for registering an alert. The system includes a network server, a storage device, an alert distribution engine, a device recognition module, and a device registration confirmation module. The network server is configured to receive identifier information about a first device from a second device representing a request to register the first device. The storage device is configured to store the identifier information is and associated with transmitting alerts. The alert distribution engine is configured to send a registration message, based on the identifier information, to the first device. The device recognition module is configured to receive a message sent from the first device in response to the registration message. The device registration confirmation module is configured to verify that the message from the first device is associated with the registration message, and to modify, based on the message from the first device, the storage device to indicate a capability of the first device.

There is also a computer program product, e.g., software, for registering an alert. The computer program product, which is tangibly embodied in an information carrier, includes instructions being operable to cause data processing apparatus, e.g., a computer, to perform several functions and/or procedures. Some functions or procedures cause the data processing apparatus to receive, via a network server, identifier information about a first device from a second device representing a request to register the first device. The functions or procedures also cause a data processing apparatus to store the identifier information in a storage device associated with transmitting alerts, and to send a registration message based on the identifier information to the first device. Typically, the functions or procedures also provide instructions to receive a message from the first device in response to the registration message, and to verify the message from the first device is associated with the registration message. Further, the functions or procedures also cause a data processing apparatus to modify, based on the message from the first device, the storage device to indicate a capability of the first device.

Implementations also provide a method of configuring an alert. The method includes enabling a user to configure, via a configuration message, an alert from any of a plurality of communication channels. The plurality of communication channels includes a mobile phone communication channel and/or an Internet communication channel. The method also associates the alert with a device that includes an associated capability. Additionally or alternatively, the method includes configuring the alert using the same device with which the alert is associated. In some implementations, the alert is transmitted using a communication channel different than the communication channel used to configure the alert. As an example, one communication channel is a voice channel and one communication channel is a data channel. In some versions, the alert is configured using voiceXML.

In some versions, enabling a user to configure an alert involves providing a web services interface, often defined using a web services description language (WSDL). Typically the configuration message is transformed into a standard format for use with the web service. In some implementations, transforming the configuration message involves converting the configuration message from an analog voice communication to a voiceXML document.

There is also a system for configuring an alert. The system for configuring the alert includes a device, one or more communications channels, and an alert monitor. The device is typically, though not limited to, a mobile device or a computer. The communications channels include a mobile phone communication channel and/or an Internet communication channel. The alert monitor is typically configured to enable a user to configure an alert using the one or more communication channels and to associate the alert with the device, the association including an associated capability. In some implementations of the system, a web services module used and is configured to receive a communication from the device using a predefined format.

Also provided is a means for configuring an alert. The means includes means for enabling a user to configure an alert from any of a number of communication channels, such as a mobile phone communication channel and/or an Internet communication channel, and means for associating the alert with a device that includes an associated capability.

There is also a computer program product for configuring an alert. The computer program product, tangibly embodied in an information carrier, e.g., software, includes instructions being operable to cause a data processing apparatus, such as a computer, to perform several functions and/or procedures. Some functions or procedures enable a user to configure, via a configuration message, an alert from any of a plurality of communication channels. The plurality of communication channels includes a mobile phone communication channel and/or an Internet communication channel. Some functions or procedures also associate the alert with a device that includes an associated capability.

Also provided is a method of performing an alert action. The method involves determining an alert action based on an alert and sending the alert to a device based on an alert logic. The method also typically includes sending the alert action to the device based on a capability of the device and identifying a received communication as a response from the device based on the alert, the communication requesting performance of the alert action. In some implementations of the method, the alert action includes news retrieval, transaction requests, account status, or combinations of these. The method may also include determining, based on the alert, if the device is authorized to request the performance of the alert action. If the device is authorized, the alert action is performed. Additionally or alternatively, the method also includes determining, based on the alert, if the user is authorized to request the performance of the alert action. If the user is authorized, the alert action is performed. The method of performing the alert action, in some versions, includes activating a software application on the device by the alert, the alert action, or both.

For any of the examples, implementations, etc. described herein, an alert typically includes alert information about an account associated with a user associated with the device. In some versions, the alert information does not include an account number or an account balance, at least until the user and/or device has been authenticated. Beneficially, this protects a client from unauthorized access to the client's financial data if the device is compromised. In some implementations, the alert includes information about a financial instrument. Financial instruments include, but are not limited to, stocks, bonds, mutual funds, index funds, indexes, loans, futures, options, bills, deposits, derivatives of any of the foregoing (e.g., complex options on stocks or options on futures), and/or various combinations of these. In some versions, the alert, when presented on the device to the client, also includes information about a company represented by a ticker symbol. The client, beneficially, does not need to provide the ticker symbol to the device; rather, the ticket symbol is automatically provided.

For any of the examples, implementations, etc. described herein, an alert action typically includes a link which, upon selection by a user, initiates transmission of a request to obtain specific account information. Additionally or alternatively, the link, upon selection by a user, initiates transmission of a request to perform a transaction associated with the financial instrument. Regardless if the account information is displayed or not before the user and/or device are authenticated, the user and/or device are usually authenticated in response to selection of the link. In some versions, the transaction includes trading the financial instrument. Typically the financial instrument has some associated value, e.g., a price in U.S. dollars. In some implementations, e.g., those where a limit order has been executed, the execution of the limit order includes purchasing one or more financial instruments, for an associated value. In some versions, the alert logic involves determining if the associated value of the financial instrument rises above and/or falls below a threshold value. In some versions, the alert action, presented to the user in response to the alert, includes the option to configure a new alert. Some of those versions further include, when configuring the new alert, setting an upper price limit, a lower price limit, or both, on the associated value of the financial instrument.

Also provided is a means for performing an alert action. The means for performing an alert action includes means for determining an alert action based on an alert, means for sending the alert to a device based on an alert logic, means for sending the alert action to the device based on a device capability, and means for identifying a received communication as a response from the device based on the alert requesting performance of the alert action.

Additionally provided is a system for performing an alert action. The system includes a device, an alert monitor, an alert distribution engine, and a device recognition module. The alert monitor is configured to send an alert to the device based on an alert logic. The alert distribution engine is configured to determine an alert action based on the alert and to send the alert action to the device based on a device capability. The device recognition module is configured to identify a received communication as a response from the device based on the alert requesting performance of the alert action.

Another implementation is a computer program product, tangibly embodied in an information carrier, for performing an alert action. The computer program product includes instructions operable to cause data processing apparatus to determine an alert action based on an alert, send the alert to a device based on an alert logic, send the alert action to the device based on a device capability, and identify a received communication as a response from the device based on the alert requesting performance of the alert action.

Any of the above examples can realize one or more of the following advantages. The registration process automatically detects a user device and can customize alerts and their associated actions based on the detected device type. By anticipating what a user is most likely to request as a result of the transmitted alert, links to those actions can be provided with the alert so that in a space limited display, the user can quickly and easily make the desired request with minimal device interaction.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings, in which.

DETAILED DESCRIPTION

Many content and financial services providers wish to keep their users/client's as informed as possible of new content, services, and/or the client's account information, regardless of the portable device the client may utilize, e.g., cellular telephone, pager, PDA, or the like. Financial services providers are used as examples, but the implementations for actionable alert registration, configuration, and invocation described herein are equally applicable to content providers, retail operations, etc.

Figure 1:
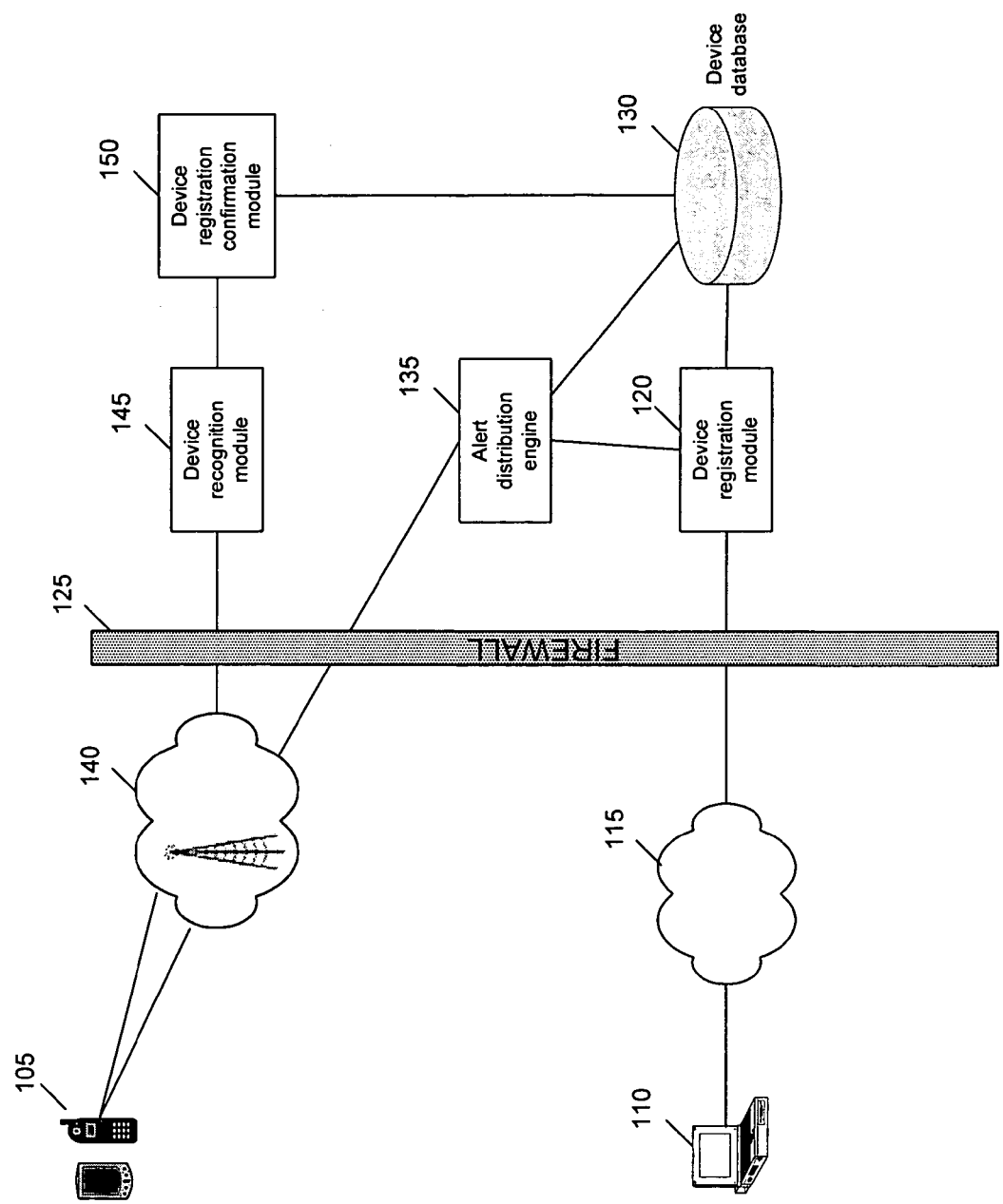
FIG. 1 is a block diagram depicting a client registering a portable device to receive actionable alerts using a desktop computer.

FIG. 1 is a block diagram depicting a client (e.g., customer) using a desktop computer 110 to register a portable device 105 to receive actionable alerts. Typically a client will provide authentication information to the financial services provider before registering a portable device 105, or being allowed to register the device 105. After being authenticated, the client, via the computer 110, communicates, over a network 115, e.g., the Internet or a local area network ("LAN"), with a device registration module 120, typically on a network server, at the financial services provider. In implementations where the financial services provider utilizes a firewall 125, the computer 110 communicates with the device registration module 120 through the firewall via, for example, an open port on the firewall 125.

The communication from the computer 110 to the device registration module 120 usually represents a request to register a portable device 105 of the client's. In some implementations, the communications between the computer 110 and the device registration module 120 includes identifier information associated with the portable device 105. The information is usually an identifier such as a telephone number, email address, a logical identifier (e.g., a device name or serial number) or physical identifier (e.g., a hardware identifier such as a Media Access Control ("MAC") address). The device registration module stores the identifier information in a storage device 130 e.g., a device database, associated with transmitting alerts. The device registration module 120 provides the registration request to an alert distribution engine 135. The alert distribution engine 135 sends a registration message to the portable device 105 based on the identifier information. For example, where the identifier is a telephone number, the registration message may be a Short Message Service ("SMS") message sent to the telephone number. In some implementations, the registration message is a Wireless Access Protocol ("WAP") message to be rendered by the portable device 105. In some embodiments the registration message uses a proprietary message format and receiving or rendering the message activates and/or executes a software application on the portable device 105. The registration message is typically sent via the network of a cellular and/or data provider 140 that the financial services provider has contracted with, though other networks, e.g., the Internet, a LAN, and/or an ATM network are applicable. For example, in some versions, where a telephone number is the identifier information, the financial services provider, rather than performing the necessary network functions such as routing and location lookups to contact the portable device 105 directly when sending the registration message, defers resolution of the phone number and the location of the portable device 105 to a third-party cellular telephone and/or data service company.

In some implementations the registration message includes a hypertext markup language ("HMTL") link. Activating the link, by, for example, clicking on the link or selecting the link and executing a "go" or "next" command, generates a response message from the portable device 105. In some implementations, activating the link involves a executing a WAP browser and interacting with the link via the WAP browser. Other alternative client software applications include executable applications based on Java 2 Mobile Edition ("J2ME"). In some implementations, the response is generated by the user interacting with the portable device 105 to send a response message, e.g., the user provides authentication information and/or manually selects and activates text and/or links in the request message. In other implementations, the response is automatically generated by the portable device 105 in response to receiving the registration message.

The generated response message is sent from the portable device 105 to the financial services provider where the response message is received by a device recognition module 145. The device recognition module 145 determines, based on the response message, information about the portable device 105. In implementations where a WAP browser on the portable device 105 sends the response message, the response is a WAP message, which typically includes information on the capabilities of the portable device 105 in the header portion of the message. Some examples of device 105 capabilities include, but are not limited to, screen size, support for various graphics formats, e.g., formats proposed by the Joint Photographic Experts Group (JPEG), Graphics Interchange Format (GIF), Portable Network Graphics (PNG), etc., presence of multimedia media players such as built-in audio/ video players, 3$^{rd}$-party players that play Macromedia Flash or Shockwave files, the availability of text parsing and rendering applications that can process Wireless Markup Language ("WML") and/or eXtensible Hypertext Markup Language ("XHTML") documents. In some implementations, the device recognition module 145 determines the throughput of the portable device 105, that is, the maximum number of bytes that can be transmitted over a connection to the device 105 for a given time frame. In some examples, the throughput information is sent by the portable device 105 to the financial services provider, e.g., in a header portion of the response message. In other examples, the device recognition module 145 determines the throughput based on interactions with the portable device 105, e.g., the amount of time between sending a data packet to the portable device 105 and the time that a completion signal is received by the device recognition module 145. Additionally, the response message may include information associating the portable device 105 with a particular published device profile. The published device profile can be used as a reference for what capabilities a portable device 105 possesses. Examples of device profiles are a WAP Profile and/or a Mobile Information Device Profile ("MIDP").

Alerts can be time-sensitive. For example, the information in the alert should be acted upon in a relatively short time frame. In some implementations, a timer is used to determine the time difference between sending the registration message from the financial services provider to the portable device 105 and when the corresponding response is received at the financial services provider. In some of those implementations, if the financial services provider does not receive the response message before the expiration of a time-out period, e.g., twenty minutes, the portable device 105 is assumed not to support the messaging format of the registration message or that the method of delivery is not reliable enough for actionable alerts. In scenarios where the portable device 105 does not support the message format of the registration message, the client is sent a communication, e.g., an email, indicating that the portable device 105 associated with the identifier information did not respond in time to the registration message or does not support the format of the registration message.

The device recognition module 145 communicates the response message to a device registration confirmation module 150 at the financial services provider. The device registration confirmation module 150 verifies the response message is associated with the registration message that was sent by the alert distribution engine 135. The device registration confirmation module 150 updates or modifies the storage device 130 to indicate the capabilities of the portable device 105 based on the response message. This is advantageous in that the client initially provides minimal information to the financial services provider and the financial services provider is able to discern information beyond what the client provided.

Figure 2:
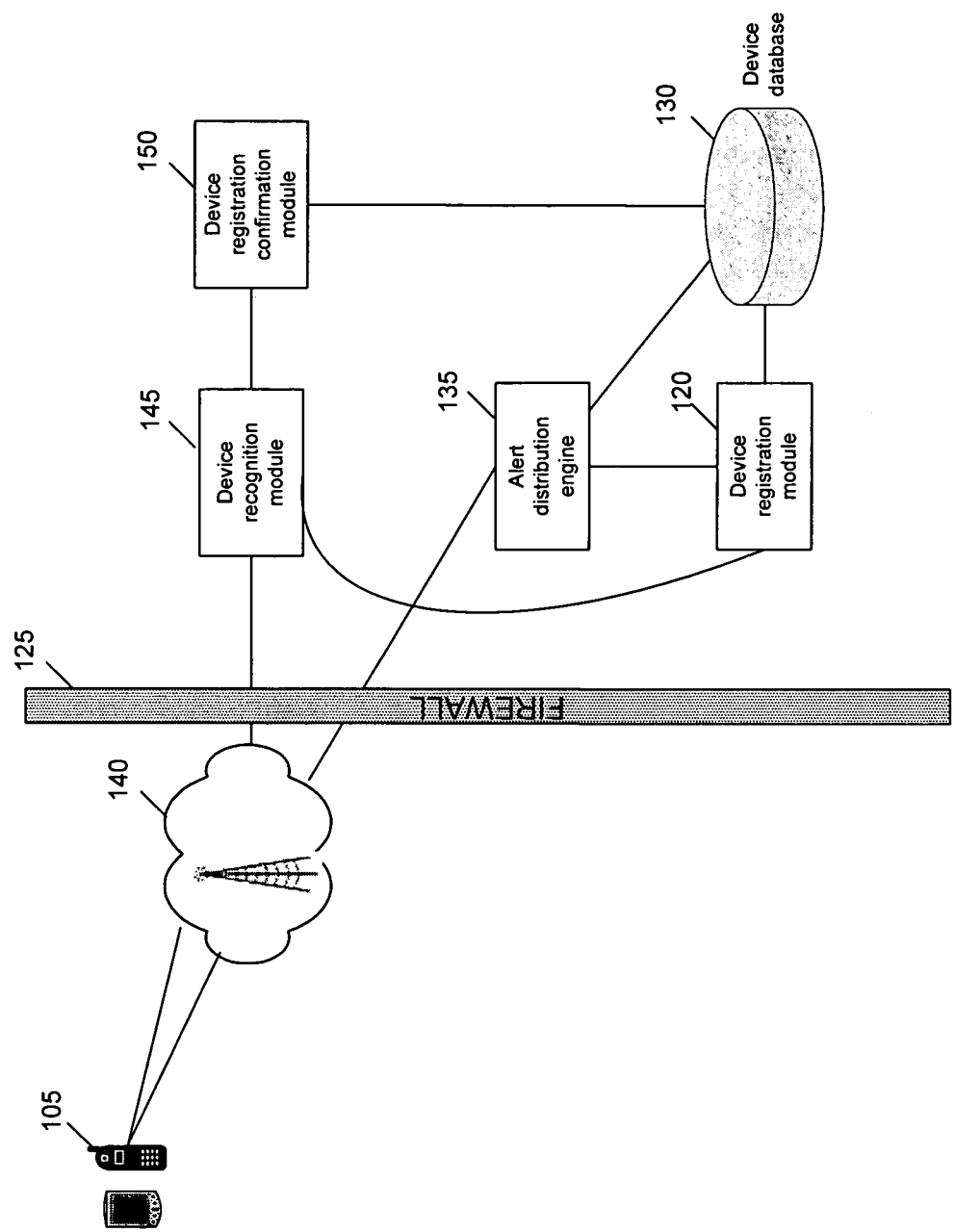
FIG. 2 is a block diagram depicting a similar but alternative implementation of the embodiment depicted in FIG. 1.

FIG. 2 is a block diagram depicting a similar but alternative implementation of the embodiment depicted in FIG. 1. In the implementation depicted in FIG. 2, instead of providing the portable device 105 identifier information to the financial services provider via a computer (110 of FIG. 1), the client provides the identifier information via the portable device 105. Using the portable device 105 to initiate registration can be accomplished, for example, via a WAP browser on the portable device 105 or a proprietary application stored and executed on the portable device 105. In these implementations, the portable device 105 communicates with the financial services provider over a network 140, e.g., a cellular telephone and/or data network, and provides the identifier information associated with the portable device 105. The device recognition module 145 detects information about the portable device 105 such as the method of communication used to communicate with the financial services provider, e.g., SMS or WAP and the device's capabilities. The device recognition module 145 communicates with the device registration module 120, providing the identifier information received from the portable device 105. The flow then follows that described above with respect to FIG. 1, e.g., the identifier information is stored in a storage device 130, the registration message is generated by the alert distribution engine 135 and sent to the portable device based on the identifier information, etc.

Figure 3:
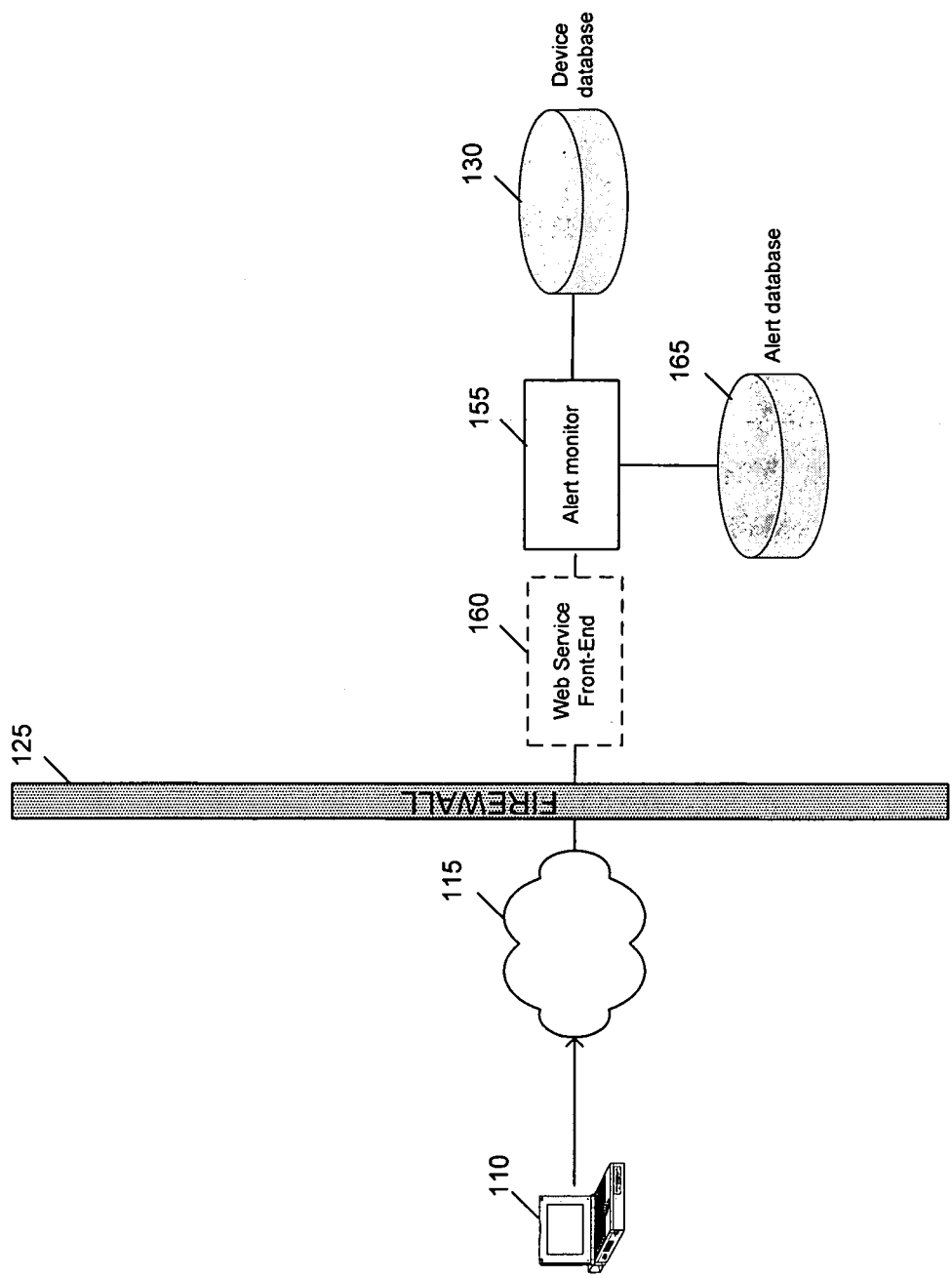
FIG. 3 is a block diagram depicting configuring an actionable alert.

FIG. 3 is a block diagram depicting configuring an actionable alert. Several input options are available for configuring an actionable alert over a variety of channels, e.g., cellular telephone and/or data networks, LANs, Wide Area Networks (WANs), ATM networks, and the like. In the implementation depicted in FIG. 3, the actionable alert is configured using a computer 110. The computer 110 connects to the financial services provider via a network 115, e.g., a LAN or the Internet. When the financial services provider has a firewall 125, typically the computer 110 will communicate with the financial services provider through an open port on the firewall 125. In some implementations, the computer 110 communicates directly with an alert monitor 155 to configure the alert.

In some implementations, however, the computer 110 communicates instead with an optional web service front-end 160 to the alert monitor 155. In versions that utilize the web service front-end 160, the web service front-end 160 receives incoming configuration communications and acts as an interface to the alert monitor 155. The web service front-end 160 defines a web service that can be accessed by any device and/or software capable of interfacing with the web service, which can be defined using, for example, a web services description language (WSDL). The web service front-end 160 can also perform pre-processing tasks on incoming configuration communications, e.g., removing errors or transforming the incoming message from the received format into a particular configuration request format used by one or more of the devices (e.g., the alert monitor 155, the device database 130, and/or the alert database 165) in the back end, using for example XSLTs. In some implementations, a front end application can receive a voice communication such as a Voice over Internet Protocol (VoIP) or analog voice communication transformed into a voiceXML message that can be formatted to interface with the web service front-end 160. Once the pre-processing of the alert is complete, the web service front-end 160 communicates the configuration communication to the alert monitor.

Regardless of if a web service front-end 160 is present or not, the configuration communication includes an alert to be stored in an alert repository 165, e.g., an alert database, file system, or the like. The alert typically includes timely information that the client asked to be notified of. This timely information is considered a trigger event, whereby when the timely information becomes known, it triggers the sending of the alert. For example, timely information might be (and an alert will be sent) when a certain specified stock price changes more than a predefined percentage of its current price. The configuration communication also includes identifier information for the portable device 105 that the alert is to be sent to. As described herein, the identifier information could be information such as a telephone number, email address, a logical identifier (e.g., a device name or serial number) and/or a physical identifier (e.g., hardware identifier). Additionally, the identifier information could be a subscriber identifier for the client associated with the client's cellular telephone or data service provider, e.g., T-Mobile, Sprint, etc., as well as the name of the cellular telephone and/or data provider. The identifier information is provided to a storage device 130, e.g., a device database. The alert monitor 155 determines if a record representing the portable device 105 is already in the storage device 130. If a record for the portable device 105 is not in the storage device 130, the alert monitor 155 returns an error to the computer 110 that the portable device 105 needs to be registered. If a record for the portable device 105 is in the storage device 130, the alert is then stored in an alert repository 165. The alert monitor 155 then determines if the trigger event has occurred. When the trigger event occurs, the process to send an alert is initiated.

Figure 4:
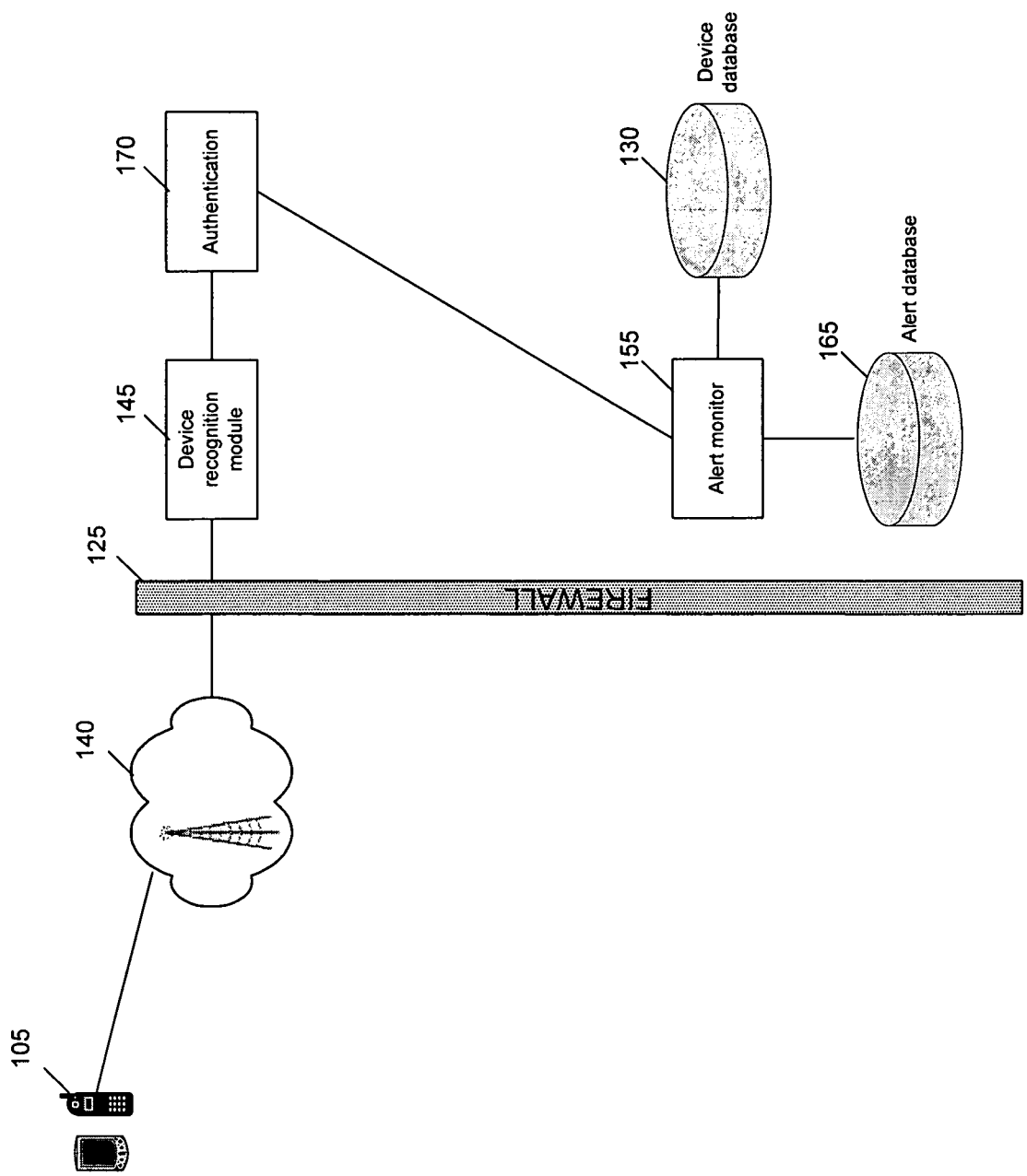
FIG. 4 is a block diagram depicting an alternate method of configuring an actionable alert.

FIG. 4 is a block diagram depicting an alternate method of configuring an actionable alert. FIG. 4 depicts an implementation where an alert is configured using a portable device 105. The portable device 105 communicates over a network 140, e.g., a cellular telephone and/or data network, with a device recognition module 145 at the financial services provider. The configuration communications typically include device capability information, alert information, and authentication information such as a username and password, subscriber identifier, or the like associated with the client. In some embodiments the authentication information is associated with the device, e.g., a logical or physical identifier. The device recognition module 145 determines the capabilities of the portable device 105 and communicates the configuration communication to an authentication module 170. The authentication module 170 determines that the authentication information provided by the client and/or device is correct and communicates the configuration communication to the alert monitor 155. The alert monitor 155 performs a device lookup in the storage device 130 as described with respect to FIG. 3, and if a record for the portable device 105 in the storage device 130 exists, the alert monitor 155 stores the alert in the alert repository 165.

Figure 5:
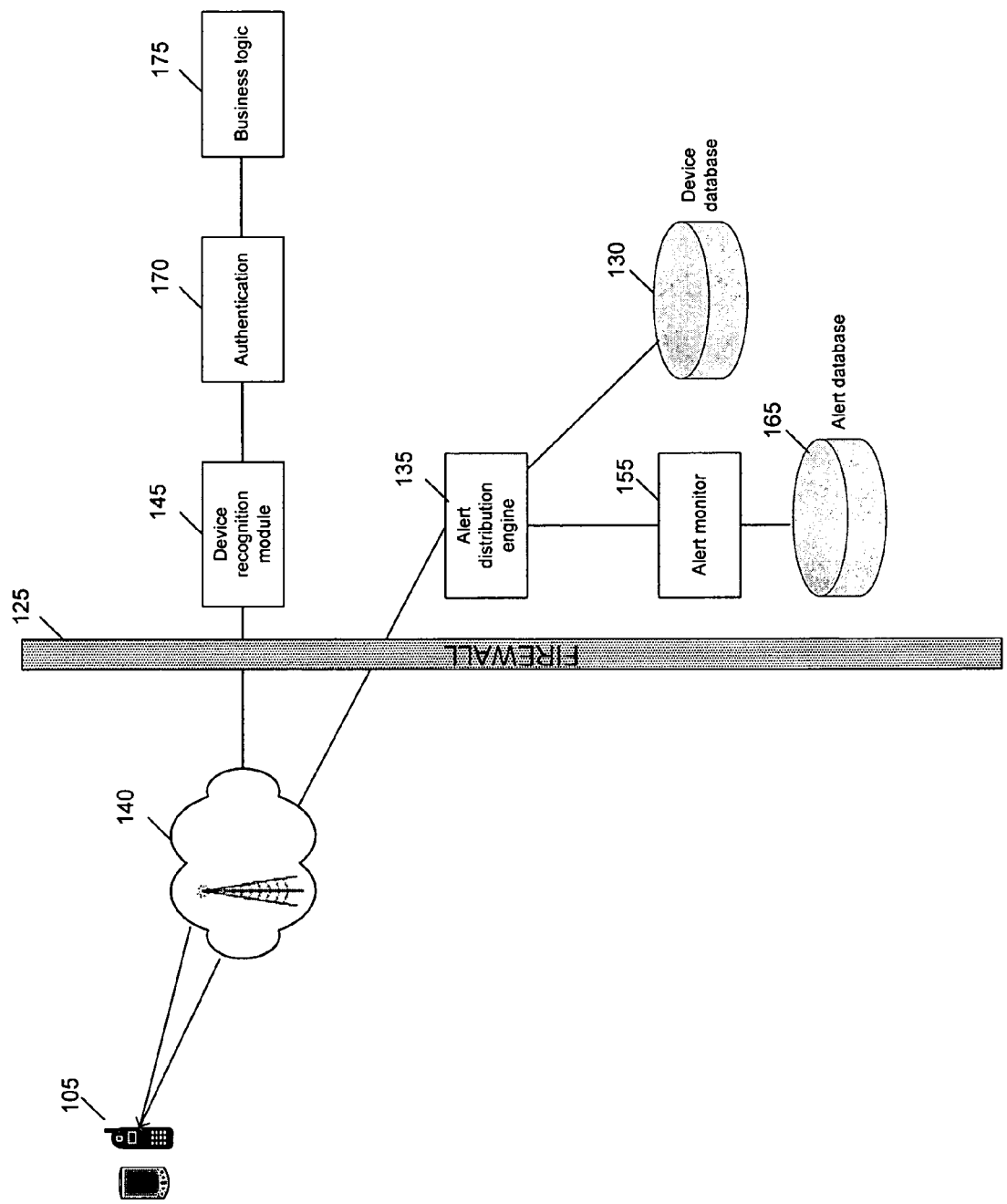
FIG. 5 is a block diagram depicting a method of invoking an alert and performing an alert action.

FIG. 5 is a block diagram depicting a method of invoking an alert and performing an alert action. Invoking an alert begins when an alert monitor 155 determines that a trigger event has occurred. In addition to examples described herein, other examples of trigger events are a particular stock, bond, mutual fund, index fund, index, loan, future, option, a bill, e.g., a T-bill or commercial paper, deposit, derivatives of the foregoing or a combination of these being valued at a certain price, a news article about a company or stock becoming available, an account or margin balance having a particular value, a margin call being issued to the client's account, confirmation for a previous transaction, or upon reaching a particular date or time. In one implementation, the alert monitor 155 determines that the trigger event has occurred by querying an alert repository 165 and processing the alerts therein using alert logic. An example of alert logic is comparing the trigger events with information received from an information supplier, e.g., a stock value feed or a news feed from Bloomberg L.P. When a trigger event has occurred, the alert monitor 155 communicates with an alert distribution engine 135 that the alert associated with the trigger event is to be sent to the appropriate portable device 105. The alert distribution engine 135 queries a storage device 130 and determines the portable device 105 associated with the alert and the capabilities of the portable device 105 based on the record representing the portable device 105 stored in the storage device 130. The alert distribution engine 135 then formats an alert based on the capabilities of the portable device 105. The alert distribution engine 135 communicates with the portable device 105, sending the alert to the portable device 105 over a communications channel 140, e.g., the Internet or LAN, or a cellular telephone and/or data network.

The portable device 105 receives the alert and an interface on the portable device 105 displays the alert. In some implementations, before the client is authenticated, information that is publicly available may also be displayed as part of the alert while information that is confidential, secret, or private to the client is not displayed. In some implementations the alert is displayed without regard to authentication information. In other implementations, the display provides only a request to the client for authorization information. Some implementations of displaying the alert and/or the request for authentication information include displaying the alert/request as an SMS message, as a web page in a WAP browser, in a proprietary client application, or, alternatively, where the device has voice capabilities, providing a voice message and/or voice menu-driven interface to the client. In some versions, the alert is sent via WAP Push, similar to sending an alert via a SMS message. In some implementations receiving the alert initiates the execution of the client application, e.g., "waking up" the portable device 105 to receive the alert. The client typically interacts with the display or inputs and sends a response, based on the alert and/or authorization request, to the financial services provider over the communications channel 140.

The alert typically a notification that a particular event occurred. In some implementations, an alert provides a choice to perform one or more alert actions. In some implementations, the provided choices include, but are not limited to, invoking a pre-scripted alert action, authorizing a purchase or sale of a stock, fund, or the like, displaying an account balance, transferring funds to and/or from an account with the financial services provider, and/or verifying a transfer, deposit, or the like. In some embodiments, the provided choices represent those actions that a client is most likely to want to perform in response to receiving that specific alert. For example, if the alert is the result of an account balance falling below a predefined limit, the client will most likely want to log on and view the balance of the client's account. In such examples, the alert includes text stating that one of the client's accounts has fallen below a predefined amount. In this case, no private information is provided in case the device is with someone other than the client at the time of the alert. Included with the text is a hyperlink titled "obtain account balance" so that upon reading the alert, the client can quickly and easily select the hyperlink and be brought directly to the log in screen, and upon verification of the client's credentials, shown the balance of the subject account.

As noted above, an alert action may include a pre-scripted alert action. A pre-scripted alert action is a set of instructions that the client provided prior to receiving the alert. The instructions direct the financial services provider to perform a series of tasks, either manually or automatically. Examples of a pre-scripted alert action are rebalancing a fund allocation or account balances, performing a stock or fund trade, initiating a fund transfer to cover a margin call, and the like.

The actions associated with the alert are typically presented on the client's device in formats described herein, e.g., as hyperlinks in a WAP browser or text and/or pictures in a proprietary client. In some implementations the client is provided with alerts over multiple channels simultaneously, e.g., receiving a voice message and inputting a response via the keypad or touch scream of the portable device. The client then selects among the choices of actions and determines which response to communicate back to the financial services provider. The response is then communicated to the financial services provider.

The device recognition module 145 identifies the received communication as a response from the portable device 105 based on the alert requesting performance of the alert action. The portable device 105 is recognized by a device recognition module 145 and the device's capabilities are determined. The device recognition module 145 communicates the response communication to an authentication module 170. The authentication module 170 verifies, based on the response communication, that the portable device 105 is authorized to act on the received alert. If the portable device 105 is authorized to perform the alert action, a portion of the communication is communicated to a business logic module 175 to perform the alert action. If the client is not authorized to perform the alert action, an error is returned to the portable device 105.

Figure 6:
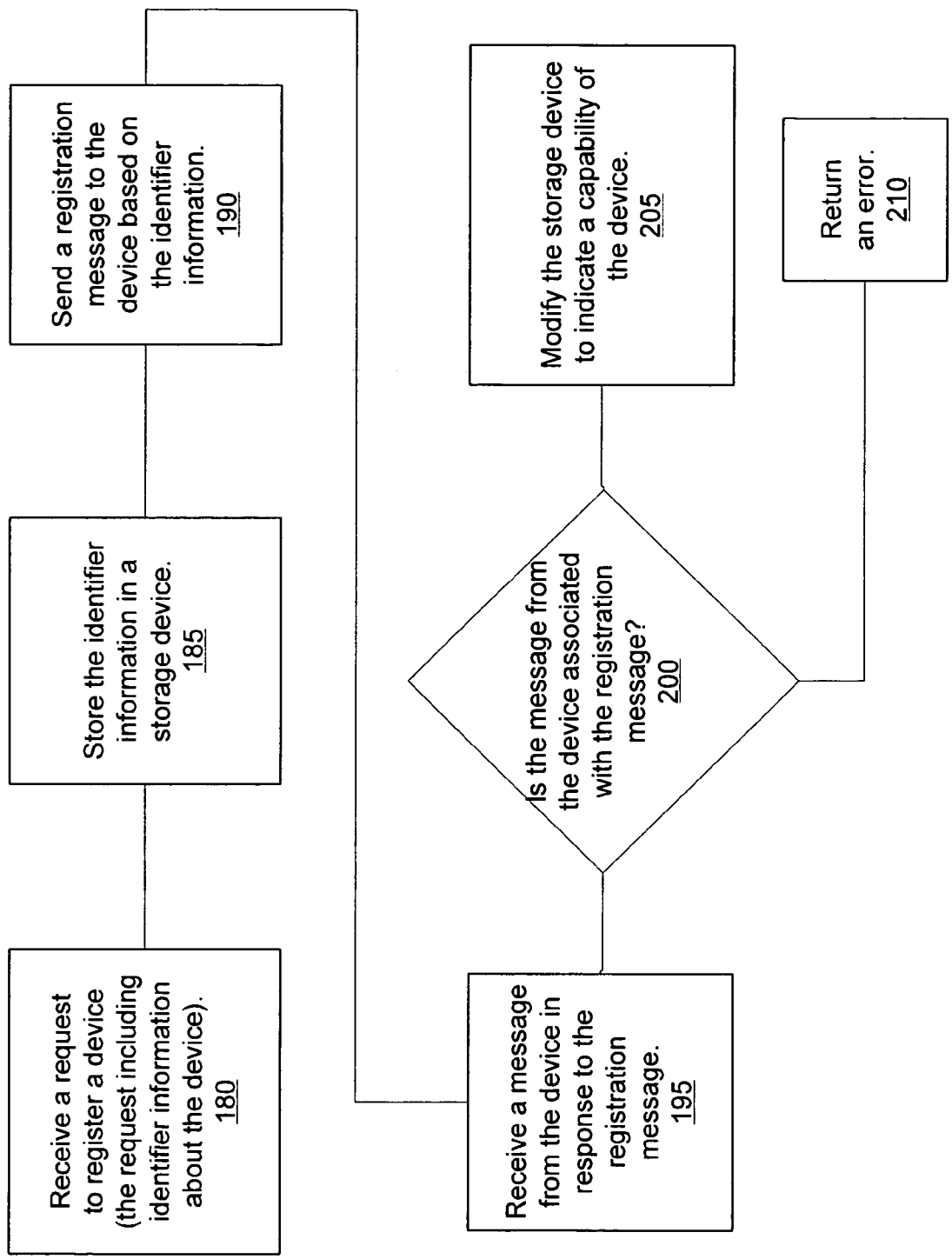
FIG. 6 is a block diagram depicting an implementation of a method for registering an alert.

FIG. 6 is a block diagram depicting an implementation of a method for registering an alert. The method includes receiving (180) a request to register a device, such as a wireless device or cellular phone 105 of FIG. 1. The request is typically received (180) by a device registration module, e.g., 120 of FIG. 1, executing on a network server and the request typically includes identifier information about a device. In some implementations the request is received (180) from the device that is being registered, i.e., the device requesting registration and the device being registered are one in the same. In other implementations the request is received from a device other than the one being registered, i.e., the device being registered is different than the device requesting the registration, e.g., a user sends a registration request for his or her wireless device or cellular phone from his or her personal computer. In either case, the identifier information is stored (185) in a storage device that is associated with transmitting alerts, e.g., the device database 130 of FIG. 1. A registration message, based on the identifier information, is then sent (190) to the device that the request was seeking registration for, e.g., a portable device 105 of FIG. 1. In some implementations, the means for sending the registration message is an alert distribution engine 135 of FIG. 1. If the device being registered sends a response message, the message is received (195), typically by a device registration module 145 of FIG. 1, in response to the registration message. A determination (i.e., verification) (200) is made, typically by a device registration confirmation module 150 of FIG. 1, if the message is from the device associated with the registration message that was sent (190). If it is verified (200) that the message is from the device that was sent (190) the registration message, the storage device is modified (205) by, for example the device registration confirmation module 150, to indicate a capability of the device. If the message is not from the device associated with the registration message, then in some implementations, an error is returned (210) to the device. In other implementations the method handles the error by writing the error to a message log, e.g., a text file or database.

Figure 7:
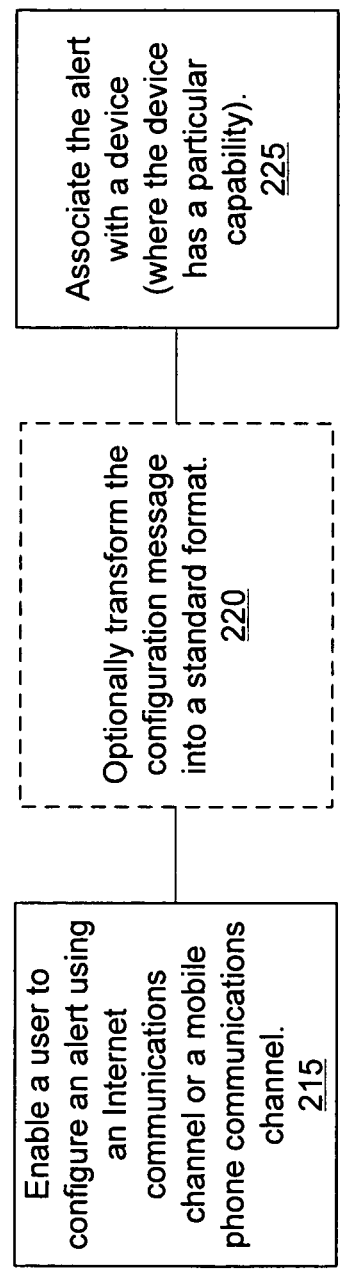
FIG. 7 is a block diagram depicting a method for configuring an alert.

FIG. 7 is a block diagram depicting a method for configuring an alert. The method includes enabling (215) a user to configure, via a configuration message, an alert from any of a plurality of communication channels. Examples of channels include a mobile phone communication channel and/or an Internet communication channel. The configuration message typically includes alert information such as a trigger event, a device to send the alert to, and possible actions a client using the device would want to perform in response to receiving the alert. Typically the configuration message is received by an alert monitor module executing on a network server, e.g., 155 of FIG. 3. In some implementations, the configuration message is optionally transformed (220) and received via a web service front-end module executing on a network server, e.g., 160 of FIG. 3, in a standard configuration format. Transforming the configuration message is advantageous in that devices or standards not yet contemplated can utilize the configuration service by implementing a web service module to conform the new device to interface with the web service, i.e., the system is not re-architected, rather only a specialized module to handle the web service format is implemented. For example an analog voice interaction/configuration can be transformed into a voiceXML document whereby some of the voiceXML attributes and elements are associated with configuration information for the alert. This saves developer time and effort, as well as increases design modularity and autonomy. The alert is then associated (225) with the device based on an associated capability of the device, e.g., a WAP alert is associated with the device if the device can display WAP messages.

Figure 8:
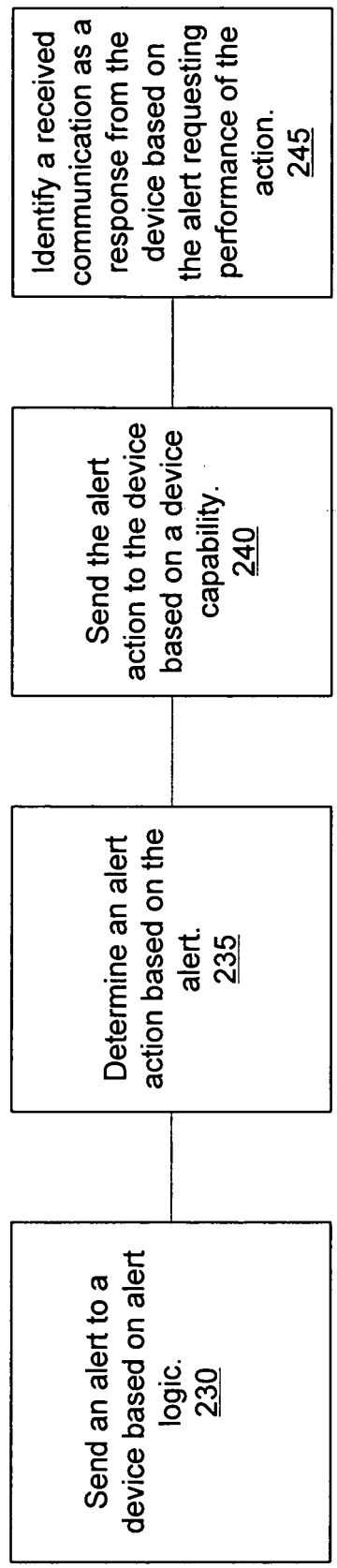
FIG. 8 is a block diagram depicting a method of performing an alert action.

FIG. 8 is a block diagram depicting a method of performing an alert action. The method begins by sending (230) an alert to a device based on an alert logic. For example, a news article is released about a company a client of the financial services provider is monitoring. In response to the news article being published, an alert associated with the news article is sent to the client's device, e.g., a wireless device 105 of FIG. 1. An alert action is determined (235), typically by, for example, an alert distribution engine 135 of FIG. 5, based on the alert. Using the previous example, based on the news article, in one implementation an alert action is "sell stock." In another implementation the alert action is "place limit order." Other transactions associated with the given context are contemplated, e.g., financial actions associated with an account at a financial services provider. The alert action is then sent (240) to the device based on a capability of the device. For example, if the device can display WAP messages, the alert action is sent (240) to the device as a WAP message with alert actions being represented as hyperlinks. In some implementations several alert actions are sent to the device serially or simultaneously, thereby providing the client with multiple options for alert actions to perform. In some implementations, the alert and the alert action are sent together in the same message. In some implementations, the alert, the alert action, or both, activates a software application on the device.

The client can respond by selecting one of the presented alert actions, thereby requesting performance of the selected alert action, which is a response to the alert. In response to receiving a message requesting performance of the alert action via, e.g., a device recognition module of 145 of FIG. 5, the message is identified (245) as being a response from the device based on the alert requesting performance of the alert action and the alert action is performed. In some implementations, the device and/or the device user are authenticated, e.g., by an authentication module 170 of FIG. 5, (or determined to be authorized to perform the alert action) before an alert action is performed. In some implementations the device and/or the device user are authenticated before the alert actions are sent to the device.

An exemplary use case is illustrative. If news, e.g., a quarterly report, is published (or is anticipated to be published) by a company, the stock price may move based of the news. If a stock price increases above or falls below a threshold that was configured by a client, the client receives a price trigger alert. The price trigger alert, in some implementations, includes a URL that launches mobile browser software residing on a client's cellular telephone. The URL loads a mobile WAP site into the mobile browser. The WAP site provides a detailed quote as well as links to perform actions (retrieve news, retrieve a chart, perform a trade, etc.). The URL contains information such that the client does not need to type in or enter a ticker symbol to retrieve information about the company, but rather the particular ticker symbol is automatically provided or filled into the appropriate text entry field by the URL. Advantageously, automatically providing the ticker symbol simplifies data entry into a mobile browser for the client.

Another example is receiving a notification that a limit "buy" order has been filled. When an order fills, the client enters into a long position in a specific stock, i.e., the client bought the stock at a certain price and hopes that the stock will increase in value so he or she can make a profit by selling the stock at the increased price. The client typically wants to sell the stock when a certain event such as a significant price movement happens, e.g., a price increase so he or she can sell the stock for a profit or a price decrease so he or she can avoid further losses. However, setting up a price trigger is contingent upon the client entering into a long position. In one implementation, the event that a limit order is filled triggers a user-driven action to set up price triggers for the purchased stock, the price triggers including particular upper and/or lower price thresholds that the client wants to sell the stock at.

The above-described techniques can be implemented in digital electronic circuitry, or in computer hardware, firmware, software, or in combinations of them. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer, on multiple computers at one site or distributed across multiple sites, and/or portable electronic devices such as, but not limited to cellular telephones, smart phones, PDAs, and the like wherein any or all of the aforementioned are interconnected by a communication network.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer or portable device. Generally, a processor receives instructions and data from a read-only memory or a random access memory or both. The essential elements of a computer or portable device are a processor for executing instructions and one or more memory devices for storing instructions and data. Generally, a computer and/or portable device also includes, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Portable devices typically provide display devices, e.g., an LCD screen or touch-screen, and input devices such as touch-screen and/or keypad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. The alternatives described herein are examples for illustration only and not to limit the alternatives in any way. The steps of the invention can be performed in a different order and still achieve desirable results. Other embodiments are within the scope of the following claims.

What is claimed is:

1. A method, executed on a computer, of registering a first device to receive an actionable alert related to financial services, comprising:
receiving, via a network server, identifier information about the first device from a second device representing a request to register the first device, the first device and the second device being different devices;
storing the identifier information in a storage device associated with transmitting actionable alerts;
sending a Short Message Service (SMS) registration message based on the identifier information to the first device, prompting the user to provide authentication information;
receiving a message from the first device in response to the registration message comprising information provided by the device regarding a capability of the first device, the message including the authentication information;

verifying the message from the first device is associated with the registration message and that the authentication information is correct;

determining, based on a time difference between sending the registration message and receiving the message in response, if the first device meets an expected level of reliability; and storing additional information in the storage device, about the first device, if the first device meets the expected level of reliability and the authentication information is correct, including the capability of the first device such that the actionable alert sent to the first device uses the capability of the device.

2. The method of claim 1 wherein modifying the storage device to indicate the capability of the first device further comprises reading header information related to the device capability in the message from the first device.

3. The method of claim 1 wherein the registration message activates a software application on the first device.

4. The method of claim 1 where the first device is a wireless device and the second device is a personal computer.

5. The method of claim 1 wherein the identifier information comprises at least one of: a telephone number, an email address, a logical identifier, a physical identifier, a Media Access Control ("MAC") address, or any combination thereof.

6. The method of claim 1 wherein the capability comprises a display resolution of the first device.

7. The method of claim 1 wherein the capability of the first device comprises an application being installed on the first device.

8. The method of claim 1 wherein the capability of the first device comprises the first device's conformance to a published device profile.

9. The method of claim 1 wherein the actionable alert is configured to prompt the user to take action based on the received alert.

10. The method of claim 1 wherein the actionable alert comprises a link which, when activated, performs one or more of the following functions: invokes a pre-scripted alert action, authorizes a purchase or sale of a stock or fund, transfers funds to or from an account with the financial services provider, or verifies a transfer or deposit.

11. A system for registering a first device to receive an actionable alert related to financial services comprising:
    means for receiving, via a network server, identifier information about the first device from a second device representing a request to register the first device, the first device and the second device being different devices;
    means for storing the identifier information in a storage device associated with transmitting actionable alerts;
    means for sending a Short Message Service (SMS) registration message based on the identifier information to the first device, prompting the user to provide authentication information;
    means for receiving a message from the first device in response to the registration message comprising information provided by the device regarding a capability of the first device, the message including the authentication information;
    means for verifying the message from the first device is associated with the registration message and that the authentication information is correct;
    means for determining, based on a time difference between sending the registration message and receiving the message in response, if the first device meets an expected level of reliability; and
    means for storing additional information in the storage device, about the first device, if the first device meets the expected level of reliability and the authentication information is correct, including the capability of the first device such that the actionable alert sent to the first device uses the capability of the device.

12. The means of claim 11 wherein the actionable alert is configured to prompt the user to take action based on the received alert.

13. A system for registering a first device to receive an actionable alert related to financial services comprising:
    a network server configured to receive identifier information about the first device from a second device representing a request to register the first device, the first device and the second device being different devices;
    a storage device associated with transmitting actionable alerts, configured to store the identifier information;
    an actionable alert distribution engine configured to send a Short Message Service (SMS) registration message, based on the identifier information, to the first device, prompting a user to provide authentication information;
    a device recognition module configured to receive a message sent from the first device in response to the registration message, the message sent in response, comprising information provided by the device regarding a capability of the first device, the message including the authentication information; and
    a device registration confirmation module configured to verify that the message from the first device is associated with the registration message; to determine, based on a time difference between when the registration message was sent and the message in response was received, if the first device meets an expected level of reliability; and to store additional information in the storage device, about the first device, if the first device meets the expected level of reliability and the authentication information is correct, including the capability of the first device such that the actionable alert sent to the first device uses the capability of the device.

14. The system of claim 13 wherein the actionable alert is configured to prompt the user to take action based on the received alert.

15. A computer program product, tangibly embodied in a machine-readable, non-transitory, storage device, for registering a first device to receive an actionable alert related to financial services, the computer program product including instructions being operable to cause data processing apparatus to:
    receive, via a network server, identifier information about the first device from a second device representing a request to register the first device, the first device and the second device being different devices;
    store the identifier information in a storage device associated with transmitting actionable alerts;
    send a Short Message Service (SMS) registration message based on the identifier information to the first device, prompting the user to provide authentication information;
    receive a message from the first device in response to the registration message comprising information provided by the device regarding a capability of the first device, the message including the authentication information;
    verify the message from the first device is associated with the registration message and that the authentication information is correct;

determine, based on a time difference between sending the registration message and receiving the message in response, if the first device meets an expected level of reliability; and store additional information in the storage device, about the first device, if the first device meets the expected level of reliability and the authentication information is correct, including the capability of the first device such that the actionable alert sent to the first device uses the capability of the device.

16. The computer program product of claim 15 wherein the capability of the first device comprises a display resolution.

17. The computer program product of claim 15 wherein the capability of the first device comprises an application being installed on the first device.

18. The computer program product of claim 15 wherein the capability of the first device comprises the first device's conformance to a published device profile.

19. The computer program product of claim 15 wherein the actionable alert is configured to prompt the user to take action based on the received alert.

* * * * *